United States Patent [19]

Umeyama

[11] Patent Number: 5,097,721
[45] Date of Patent: * Mar. 24, 1992

[54] TORSIONAL DAMPER TYPE FLYWHEEL DEVICE

[75] Inventor: Mitsuhiro Umeyama, Toyota, Japan

[73] Assignee: Toyota Jidosha Kabushiki Kaisha, Toyota, Japan

[*] Notice: The portion of the term of this patent subsequent to Aug. 21, 2007 has been disclaimed.

[21] Appl. No.: 400,697

[22] Filed: Aug. 30, 1989

[30] Foreign Application Priority Data

Sep. 30, 1988 [JP] Japan .................. 63-127229[U]

[51] Int. Cl.$^5$ .......................... F16D 3/14; F16F 15/12
[52] U.S. Cl. .................................. 74/574; 74/572; 192/106.2; 464/64; 464/68
[58] Field of Search ............... 74/572, 573 R, 574; 464/68, 64, 66; 192/106.2

[56] References Cited

U.S. PATENT DOCUMENTS

| | | |
|---|---|---|
| 3,982,617 | 9/1976 | Worner . |
| 4,693,354 | 9/1987 | Umeyama et al. .......... 74/574 |
| 4,732,250 | 3/1988 | Maucher . |
| 4,846,759 | 7/1989 | Worner et al. ............. 74/574 |
| 4,850,244 | 7/1989 | Eckel et al. ............. 74/572 X |
| 4,850,932 | 7/1989 | Kagiyama et al. ......... 464/68 |
| 4,904,225 | 2/1990 | Worner et al. ........... 464/67 |
| 4,950,204 | 8/1990 | Umeyama et al. ......... 74/574 |
| 4,950,205 | 8/1990 | Umeyama ................ 464/68 |

FOREIGN PATENT DOCUMENTS

| | | |
|---|---|---|
| 0259173 | 3/1988 | European Pat. Off. ......... 74/574 |
| 0321121 | 6/1989 | European Pat. Off. ......... 74/574 |
| 2593252 | 7/1987 | France . |
| 45-27138 | 10/1970 | Japan . |
| 63-42950 | 3/1988 | Japan . |
| 63-42953 | 3/1988 | Japan . |
| 63-53033 | 4/1988 | Japan . |
| 63-132144 | 8/1988 | Japan . |
| 63-178651 | 11/1988 | Japan . |
| 63-178652 | 11/1988 | Japan . |
| WO88/07147 | 9/1988 | PCT Int'l Appl. ............. 74/574 |
| 2163524 | 2/1986 | United Kingdom ............. 74/574 |
| 2186344 | 8/1987 | United Kingdom ............. 74/574 |
| 2206950 | 1/1989 | United Kingdom ............. 74/574 |

OTHER PUBLICATIONS

Antriebstechnik, vol. 26, No. 12, Dec. 1987, p. 132; R. Schumann: "Hydrodamp-ein neuer torsionsschwingungsdampfer fur verbrennungsmotoren".

*Primary Examiner*—Vinh T. Luong
*Attorney, Agent, or Firm*—Cushman, Darby & Cushman

[57] ABSTRACT

A flywheel device is provided which includes a drive side flywheel, a driven side flywheel rotatable relative to the drive side flywheel, and a plurality of springs which connect the drive side flywheel and the driven side flywheel on arms defined on the driven side flywheel. The arms are provided so that all springs engage the arms at the same time during acceleration while only some of the springs engage the arms during deceleration. Finally, the deceleration side spring constant of the flywheel device is smaller than the acceleration side spring constant of the flywheel device.

6 Claims, 9 Drawing Sheets

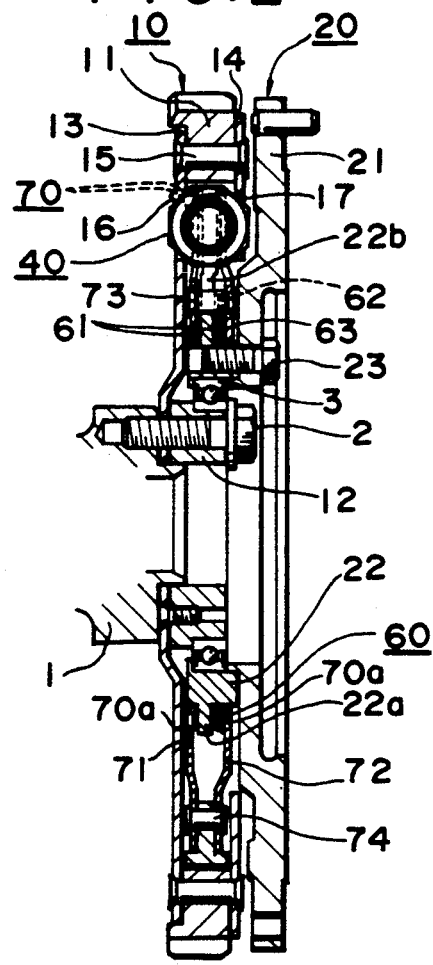
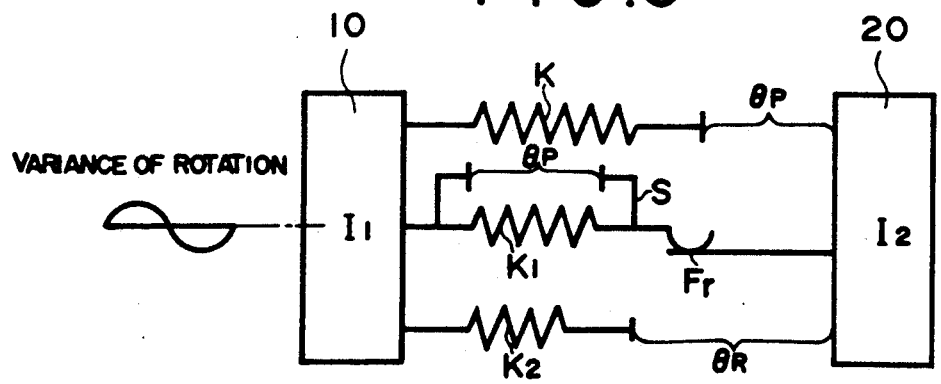

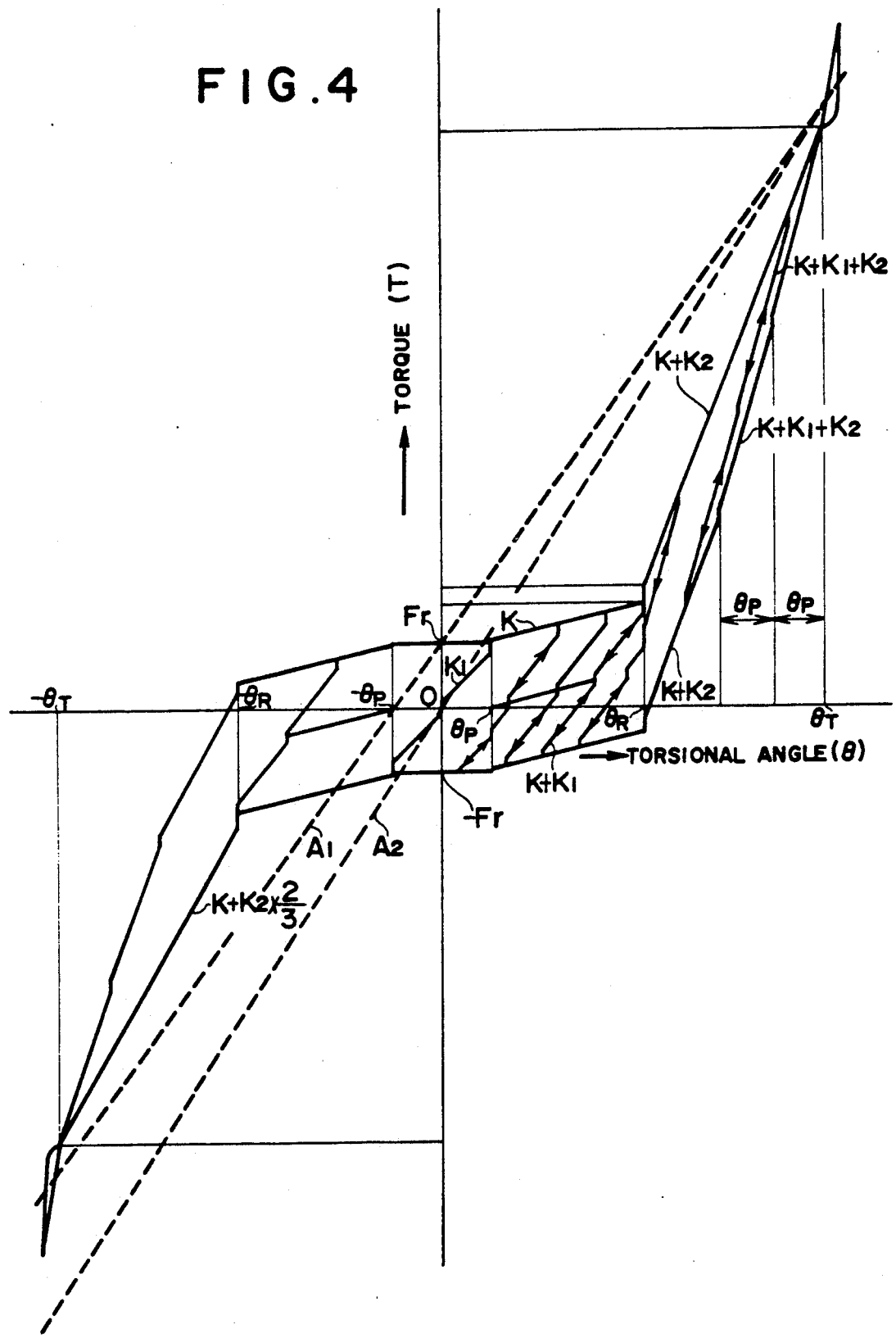

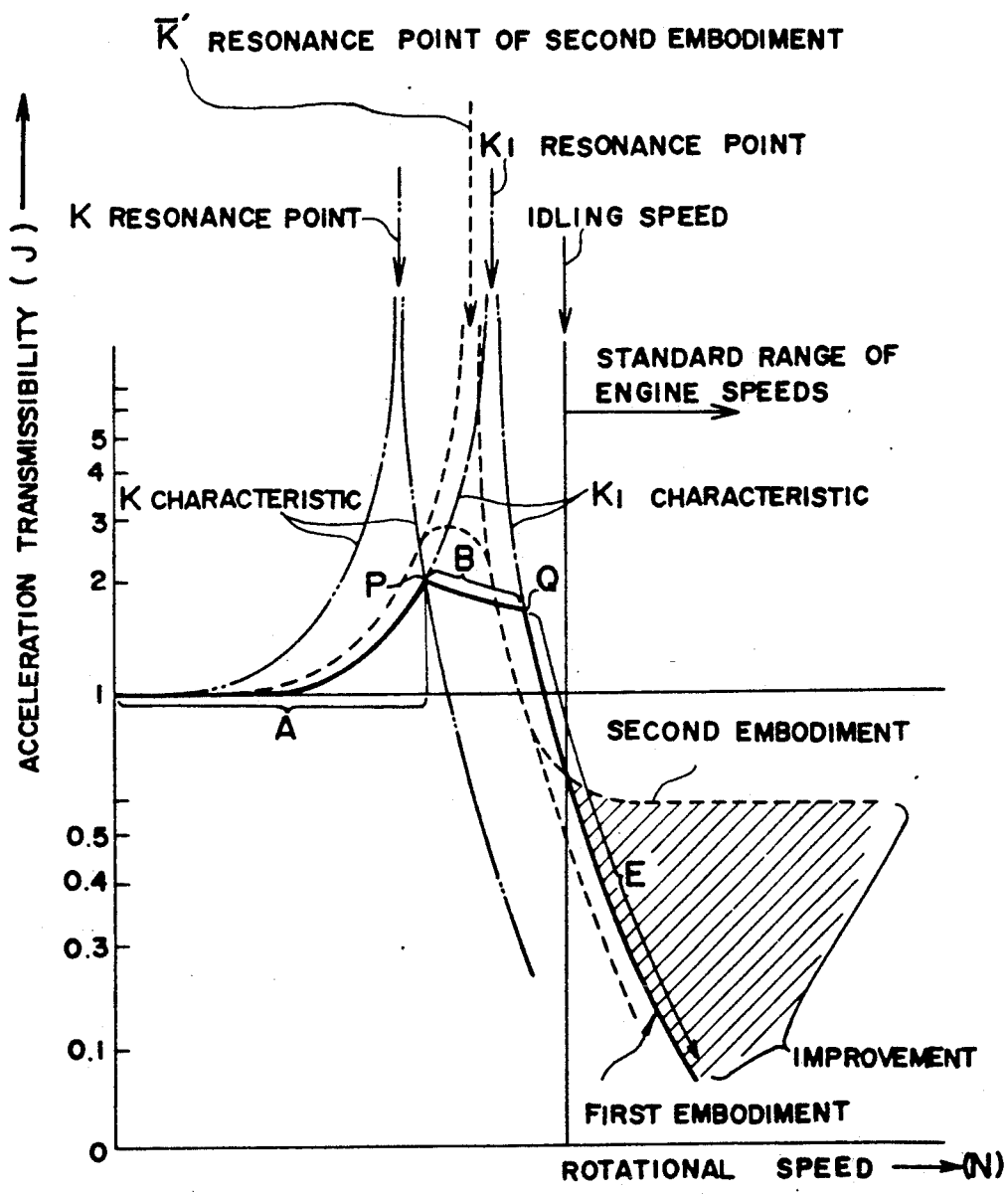

TORSIONAL DAMPER TYPE FLYWHEEL DEVICE

BACKGROUND OF THE INVENTION

1. Field of the Invention

The present invention relates to a divisional type flywheel device as a torsional damper, hereinafter referred to as a torsional damper type flywheel device. More particularly, the present invention relates to a torsional damper type flywheel device having a deceleration side spring constant which is less than an acceleration side spring constant thereof.

2. Description of the Prior Art

Prior art torsional damper type flywheel devices, which include drive side and driven side flywheels connected by a plurality of springs, have the same spring constant and therefore the same torque capacity for the acceleration side and the deceleration side thereof. However, in a flywheel device coupled to an automobile engine, the deceleration side torque capacity need not be as great as the acceleration side torque capacity and can be as small as to at most bear an engine brake torque.

A torsional damper type flywheel device having the same, great spring constant for the acceleration and deceleration sides thereof has the disadvantage that the flywheel device may cause a vibration of great amplitude when an unexpected, great torque acts on the flywheel device, for example, at the time of ignition miss, because the vibration is amplified on both the acceleration and deceleration sides. Also, the unnecessarily high deceleration side torque capacity requires that a relatively great space be provided for rotation of the torque transmitting arms on the deceleration side as well as on the acceleration side thereof, which restricts the space for arranging other components and makes it difficult to design a compact flywheel device.

SUMMARY OF THE INVENTION

An object of the invention is to provide a torsional damper type flywheel device having a deceleration side spring constant which is less than an acceleration side spring constant thereof, whereby a great amplitude vibration cause by the flywheel device is unlikely even if an unexpected, great torque acts on the flywheel device and whereby components of the flywheel device can be more freely arranged than in conventional flywheel devices which have a constant spring constant for both the acceleration and deceleration sides thereof.

The above-described object is attained with the torsional damper type flywheel device in accordance with the present invention. More particularly, a torsional damper type flywheel device is provided which has a drive side flywheel rotatable relative to an axis of rotation; a driven side flywheel rotatable relative to the drive side flywheel about the axis of rotation; and at least one spring mechanism detachably supported by the drive side flywheel and including at least one spring, one of the at least one spring mechanisms including a plurality of springs. The torsional damper type flywheel device further includes a plurality of torque transmitting arms rotatable relative to the drive side flywheel and circumferentially opposing the springs of the one spring mechanism, the arms being arranged relative to the springs of the one spring mechanism so that all the springs of the one spring mechanism are engageable with the arms in an acceleration direction of the springs and only one portion of the springs of the one spring mechanism are engageable with the arms in a deceleration direction of the springs.

In the torsional damper type flywheel thus constructed, the deceleration side spring constant is smaller than the acceleration side spring constant in a relatively great torque range where the springs of the one spring mechanism operate, because only one portion of the springs of the one spring mechanism operates in the deceleration-side rotation of the springs. Because the acceleration and deceleration spring constants are not equal, it is unlikely that the flywheel device will cause a vibration of great amplitude, because even if the vibration is amplified in an acceleration-side component of the vibration, the vibration is not amplified in a deceleration-side component of the vibration as much as in the acceleration side. For example, although the acceleration-side vibration may grow when a periodic force having frequencies close to the accleration-side natural frequency of the flywheel device acts on the flywheel device, the deceleration-side vibration does not tend to grow, because the acceleration-side and deceleration-side natural frequencies of the flywheel device are different.

In addition, the configuration of the arms is such that there is space for arranging other components of the flywheel device. Thus, the freedom of design of the flywheel device is increased.

BRIEF DESCRIPTION OF THE DRAWINGS

The above and other objects, features and advantages of the invention will become apparent and will be more readily appreciated from the following detailed description of the preferred exemplary embodiments of the invention taken in conjunction with the accompanying drawings, in which:

FIG. 2 is a cross-sectional view of the flywheel device taken along line II—II of FIG. 1;

FIG. 3 is a system diagram illustrating a vibrational system of the flywheel device of FIG. 1;

FIG. 4 is a diagram illustrating a torsional angle-torque characteristic of the flywheel device of FIG. 1;

FIG. 5 is a graph illustrating an engine speed-acceleration transmissibility characteristic of the flywheel device of FIG. 1;

DETAILED DESCRIPTION OF THE PREFERRED EMBODIMENTS

Figure 1:
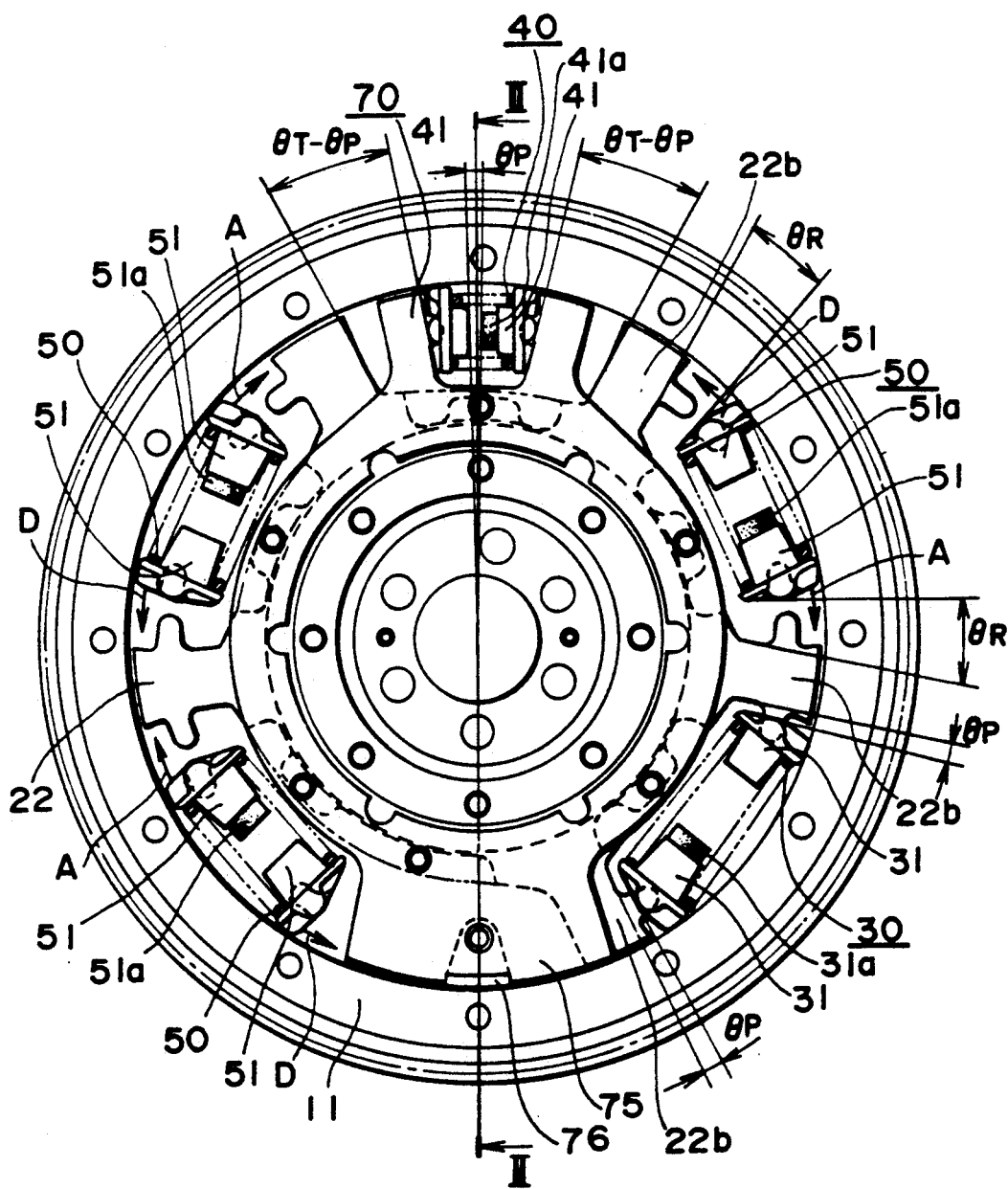
FIG. 1 is an elevational view of a torsional damper type flywheel device in accordance with a first embodiment of the present invention.

FIGS. 1 to 7 illustrate a torsional damper type flywheel device in accordance with the first embodiment of the present invention. For the purpose of facilitating an understanding the relatively complicated components of the flywheel device of the first embodiment, a vibrational system thereof will first be explained with reference to FIG. 3.

In FIG. 3, moments of inertia of a drive side and a driven side of the flywheel device are denoted with references I1 and I2, respectively. The drive side includes a drive side flywheel 10 and the driven side includes a driven side flywheel 20, which are rotatable relative to each other about a common axis of rotation. Drive side flywheel 10 is coupled to an engine crankshaft of a vehicle and driven side flywheel 20 is coupled to a power train of the vehicle. The drive side and driven side flywheels 10 and 20 are connected by a first spring mechanism including at least one first spring 30 (FIG. 1), hereinafter a K spring, and having a synthetic spring constant K, with a predetermined angular gap $\theta_P$. The drive side and driven side flywheels 10 and 20 are also connected by a second spring mechanism including at least one second spring 40 (FIG. 1), hereinafter a K1 spring, and having a synthetic spring constant K1, via a friction mechanism 60 (FIG. 2). Friction mechanism 60 is arranged in series with K1 spring 40 and has a predetermined frictional force Fr at which friction mechanism 60 begins sliding. K1 spring 40 and friction mechanism 60 are connected via a control plate 70 (FIG. 2) which is rotatable relative to the drive side and driven side flywheels 10 and 20 about their common axis of rotation. The series arrangement of K2 spring 40 and friction mechanism 60 is arranged in parallel with K spring 30 as a spring arrangement. The drive side and driven side flywheels 10 and 20 are further connected by a third spring mechanism including a plurality of third springs 50 (FIG. 1), hereinafter a K2 spring, with an angular gap $\theta_R$ which is greater than the angular gap $\theta_P$. K2 spring 50 is arranged in parallel with K spring 30 and also in parallel with the series arrangement of K1 spring 40 and friction mechanism 60. One K spring 30, one K1 spring 40, and three K2 springs 50 are provided in the embodiment of FIG. 1.

The components of the flywheel device of the first embodiment will now be more explained fully.

As illustrated in FIG. 2, drive side flywheel 10 includes an outer ring 11, an inner ring 12 disposed radially inside and spaced from outer ring 11, a pair of drive plates 13 and 14 disposed on opposite sides of outer ring 11 and fixed to outer ring 11 by rivets 15. Inner ring 12 is fixed to drive plate 13. Drive side flywheel 10 is coupled to an engine crankshaft 1 by bolts 2. Drive plate 13 and drive plate 14 have openings or slots 16 and 17, respectively, formed therein.

As illustrated in FIG. 1, K spring 30, K1 spring 40, and K2 springs 50 are detachably supported in the openings or slots 16 and 17 of drive plates 13 and 14. More particularly, each spring 30, 40, 50 detachably contacts rim walls of the circumferential ends of the opening or slot 16, 17 via spring seats 31, 41, 51, respectively, disposed at opposite ends of the spring. At least one of the spring seats 31, 41, 51 disposed at opposite ends of each spring 30, 40, 50 includes a cushion 31a, 41a, 51a constructed of rubber.

As illustrated in FIG. 2, driven side flywheel 20 includes a flywheel body 21 axially opposing drive side flywheel 10 and a driven plate 22 fixed to flywheel body 21 by bolts 23. Driven side flywheel 20 is rotatably supported by drive side flywheel 10 via a bearing 3. Driven plate 22 includes an annular portion 22a (FIG. 7) and a plurality of torque transmitting arms 22b extending (FIG. 7) radially outwardly from the annular portion 22a. As shown in FIG. 1, arms 22b circumferentially oppose K spring 30 with an angular gap $\theta_P$, and circumferentially oppose K2 springs 50 with an angular gap $\theta_R$ which is greater than the angular gap $\theta_P$. An angular gap $\theta_P$ is provided between the spring seats 41 disposed at the opposite ends of K1 spring 40 so that when a relative rotation of $\theta_P$ occurs between drive side flywheel 10 and control plate 70, one of the spring seats 41 is brought into engagement with the other to cause friction mechanism 60 to begin sliding.

Figure 7:
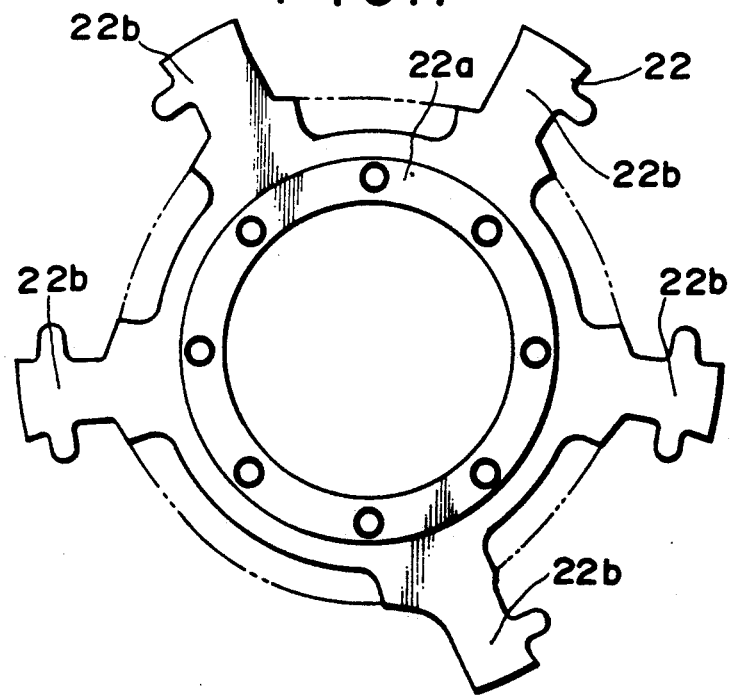
FIG. 7 is an elevational view of a driven plate of the flywheel device of FIG. 1.

As illustrated in FIG. 1, two arms 22b radially extend on opposite sides of the K spring 30 to bear one portion of the torque transmitted between the drive side and driven side flywheels 10 and 20 through K spring 30. Also, some arms 22b extend radially on sides of the K2 springs 50 to bear another portion of the torque transmitted between the drive side and driven side flywheels 10 and 20. In this regard, as illustrated in FIGS. 1 and 7, the arms 22b are arranged on the deceleration side of at least one, but not all of the three K2 springs 50. On the other hand, an arm 22b is provided on an acceleration side of every K2 spring 50. Thus, it can be said that driven plate 22 is partially armless on the deceleration side of the K2 springs 50. In the embodiment shown in FIG. 7, a single deceleration side arm has been omitted from driven plate 22. That is, five arms 22b including two deceleration side arms and three acceleration side arms are provided for the three K2 springs 50. Due to this partial arm structure, the deceleration side spring constant of the flywheel device is smaller than the acceleration side spring constant thereof at the torsional angle ranges above $\theta_R$ and below $-\theta_R$ as shown in FIG. 4, and the deceleration side torque capacity of the flywheel device is smaller than the acceleration side torque capacity thereof by an amount of torque which the omitted arm would bear if it had been provided.

Figure 6:
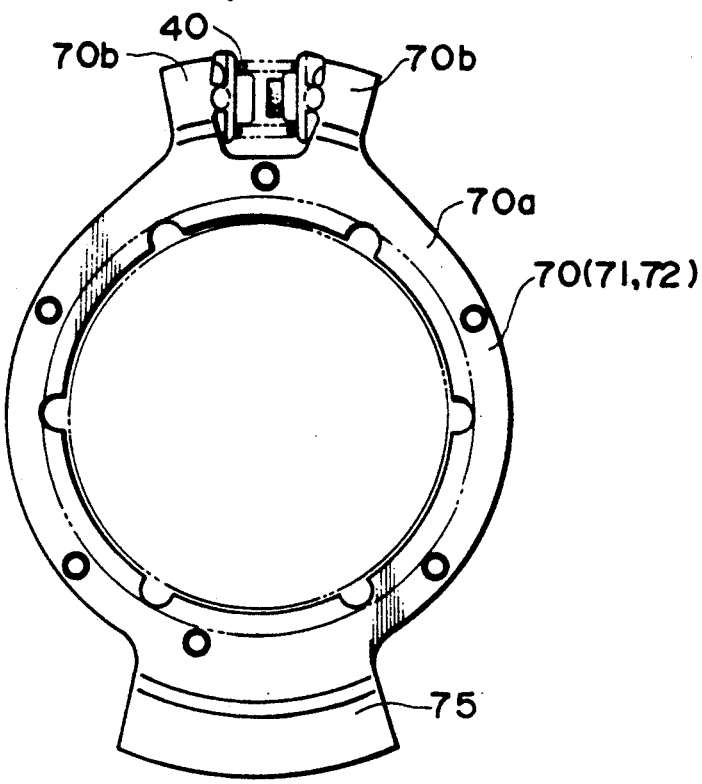
FIG. 6 is an elevational view of a control plate of the flywheel device of FIG. 1.

As shown in FIG. 2, control plate 70 comprises an assembly of two control plate elements 71 and 72 connected to each other by rivets 73 and 74. As shown in FIG. 6, control plate 70 includes an annular portion 70a and arms 70b extending radially outwardly from the annular portion 70a. Control plate 70 has two arms 70b detachably supporting K1 spring 40 therebetween. K1 spring 40 is also supported by drive side flywheel 10. When a relative rotation occurs between drive side flywheel 10 and control plate 70, K1 spring 40 is supported by drive side flywheel 10 at one end of the K1 spring 40 and by control plate 70 at the other end of the K1 spring 40. Control plate 70 includes a balancer 75 for balancing half the weight of K1 spring 40 when one end of the K1 spring 40 is supported by control plate 70. A bearing seat 76 (FIG. 1) is fixed to balancer 75 for causing control plate 70 to smoothly rotate relative to outer ring 11 of drive plate 10.

As shown in FIG. 2, friction mechanism 60 includes a thrust lining 61, a thrust plate 62, and a cone spring 63 which are disposed between annular portion 70a of control plate 70 and annular portion 22a of driven plate 22. Cone spring 63 determines the predetermined frictional force Fr of friction mechanism 60, and friction mechanism 60 slides momentarily only when the torque force acting on friction mechanism 60 exceeds the predetermined frictional force Fr.

FIG. 4 illustrates a torsional angle ($\theta$)-torque (T) characteristic of the flywheel device having the vibrational system shown in FIG. 3. When the torsional angle $\theta$, that is, a relative rotation between the drive side and driven side flywheels 10 and 20, is less than $\theta_P$, neither K spring 30 nor K2 spring 50 operates and only K1 spring 40 operates. At that time, the spring constant of the flywheel device is K1 as defined by K1 spring 40. When the torsional angle $\theta$ increases and enters the range of $\theta_P$ to $\theta_R$, the force due to the compression deformation of K1 spring 40 is greater than the predetermined frictional force Fr of friction mechanism 60 and, therefore, friction mechanism 60 slides momentarily to make K1 spring 40 ineffective. In this torsional angle range, only K spring 30 operates. In the torsional angle range of $-\theta_R$ to $+\theta_R$, the torque to torsional angle characteristics in the acceleration and the deceleration sides, that is, in the positive and negative ranges of torsional angles, respectively, are symmetrical with respect to the origin and, therefore, the flywheel device has the same spring constant and torque capacity for the acceleration and deceleration sides thereof. However, when the torsional angle increases and enters the torsional angle ranges above $\theta_R$ and below $-\theta_R$, the acceleration side spring constant and the deceleration side spring constant of the flywheel device are asymmetric with respect to the origin.

More particularly, in the acceleration side at torsional angles above $\theta_R$, K spring 30, K1 spring 40 and K2 springs 50 are all in engagement with arms 22b of driven plate 22. Thus, the spring constant of the flywheel device is K+K1+K2, where K2 is a synthetic spring constant of the three K2 springs 50. On the other hand, in the deceleration side at torsional angles below $-\theta_R$, one of the three K2 springs 50 is ineffective due to the arm structure of driven plate 22. Thus, the spring constant of the flywheel device is K+K1+$\frac{2}{3}$*K2 which is smaller than the acceleration side spring constant. When the torsional angle further increases and finally reaches an angle $\theta_T$, cushions 31a, 41a, and 51a of spring seats 31, 41, and 51, respectively, are brought into engagement with opposite spring seats 31, 41, and 51. At torsional angles above $\theta_T$ and below $-\theta_T$, the cuchions deform to draw a hysteresis due to the rubber. Because the deceleration side spring constant is reduced at torsional angles below $-\theta_R$, when the flywheel device is amplified in the acceleration side vibration, it is suppressed in the deceleration side vibration. As a result, even if an unexpected, great torque acts on the flywheel device, the flywheel device may not cause a vibration of great amplitude at the range accompanied by a great torque variance where K2 springs 50 operate.

FIG. 5 illustrates an engine speed (N)-acceleration transmissibility (J) characteristic of the flywheel device of the first embodiment. In vibrations with small vibrational amplitudes within torsional angles $+\theta_P$ and $-\theta_P$, the flywheel device operates in accordance with a K1 characteristic where only K1 spring 40 operates. In vibrations with great amplitudes exceeding torsional angles $\theta_P$ and $-\theta_P$ but not exceeding torsional angles $\theta_R$ and $-\theta_R$, the flywheel device operates in accordance with a K characteristic where only K spring 30 operates because friction mechanism 60 slides to make K1 spring 40 ineffective. In this way, the flywheel device has two kinds of vibrational characteristics having different resonance points. Because the torque is small at the standard range of engine speeds, the flywheel device operates in accordance with the K1 characteristic at the standard range of engine speeds without sliding of friction mechanism 60. Because friction mechanism 60 does not slide at the standard range of engine speeds, the speed and torque variance absorbing effect of the flywheel device is greatly improved.

When the engine speed approaches the resonance point of the K1 characteristic during start-up and stopping of the engine, the vibrational amplitude increases accompanied by an increase in torque. When the torque finally reaches a torque corresponding to the predetermined frictional force Fr of friction mechanism 60, friction mechanism 60 begins to slide to make K1 spring 40 ineffective. At the same time, the flywheel device changes its characteristic from the K1 characteristic to the K characteristic, that is, from point P to Q or point Q to P of FIG. 5 along line B of FIG. 5 accompanied by the sliding of friction mechanism 60. This characteristic change occurs very swiftly as if the characteristic jumped the K1 resonance point substantially without an accompanying increase in the transmissibility. When the engine speed changes away from the K1 resonance point after jumping the K1 resonance point along line E, A of FIG. 5, the vibrational amplification gradually decreases and the torque acting on friction mechanism 60 ultimately becomes less than the predetermined frictional force Fr. At the same time, friction mechanism 60 stops sliding, and the flywheel device again operates in accordance with the K1 characteristic. In this way, no notable resonance is seen in the flywheel device. The effect of the reduced spring constant in accordance with the invention is not shown in FIG. 5, because FIG. 5 illustrates a characteristic of relatively small torque range, and the effect of K2 springs 50 appears in a relatively great torque range.

The configuration of the arms 22b of driven plate 22 increases the freedom of arrangement of rivet 73 for coupling control plate elements 71 and 72. More particularly, because an arm which would otherwise be provided at the left, bottom portion of driven plate 22, as shown in FIG. 7, is omitted, an additional rivet 73 can be arranged at the left, bottom portion of control plate 70, as shown in FIG. 6. The coupling of control plate elements 71 and 72 by six rivets including the additional rivet 73 improves the rigidity of control plate 79 and, in turn, makes friction mechanism 60 operate in a more stable manner.

FIGS. 8 to 12 illustrate another torsional damper type flywheel device provided in accordance with the second embodiment of the present invention.

Figure 10:
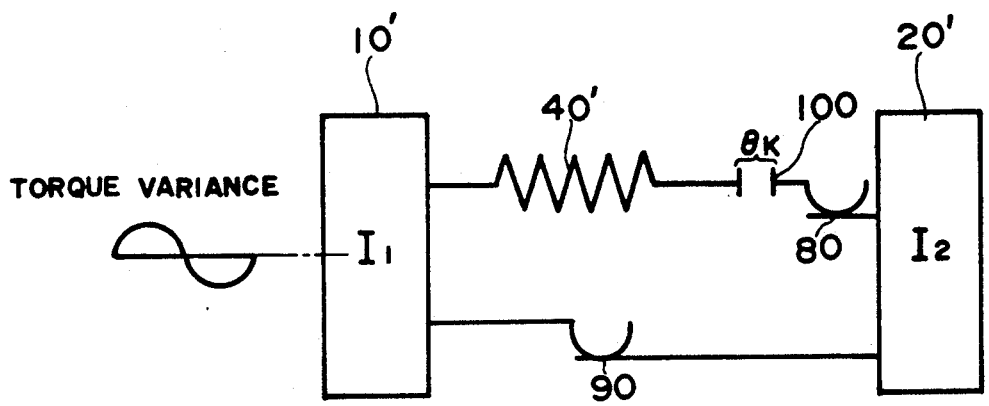
FIG. 10 is a system diagram illustrating a vibrational system of the flywheel device of FIG. 8.

FIG. 10 illustrates a vibrational system of the flywheel device of the second embodiment. This embodiment includes a drive side flywheel 10' and a driven side flywheel 20' rotatable relative to each other about a common axis of rotation. The drive side and driven side flywheels 10' and 20' have moments of inertia I1' and I2', respectively, and are connected to each other via (a) a series combination of a spring mechanism including a plurality of springs 40' and a torque limiting mechanism 80 and (b) a hysteresis mechanism 90 arranged in parallel with that series combination. Hysteresis mechanism 90 includes a continuously sliding friction mechanism. Torque limiting mechanism 80 does not slide at a standard torque range but slides only when the torque is excessively large, to protect the power train. Springs 40' and torque limiting mechanism 80 is connected by a driven disk 100 with an angular gap $\theta_K$.

Figure 12:
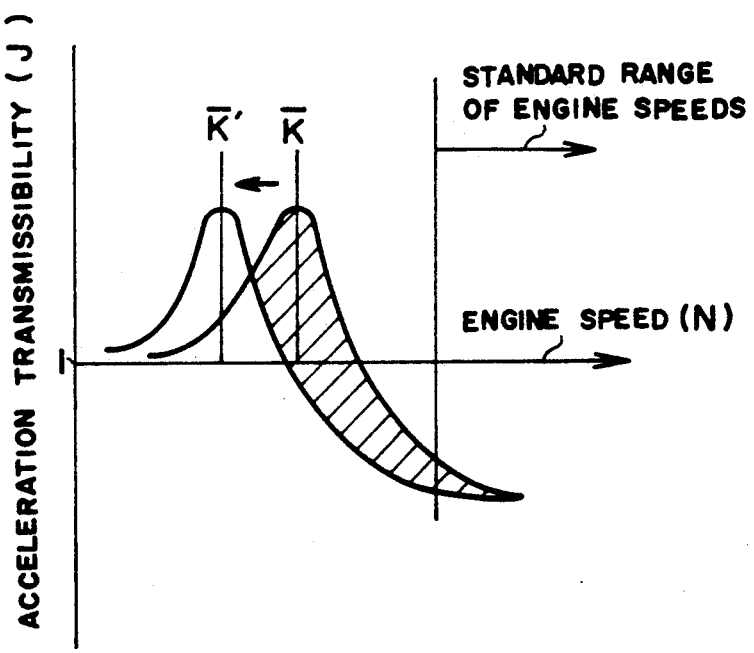
FIG. 12 is a graph illustrating an engine speed-acceleration transmissibility characteristic of the flywheel device of FIG. 8.

FIG. 12 illustrates an engine speed (N)-acceleration transmissibility (J) characteristic of a flywheel device having the vibrational system shown in FIG. 10. As is apparent from FIG. 12, the flywheel device has a single vibrational characteristic $\overline{K}'$ having a single resonance point. Hysteresis mechanism 90 is necessary to suppress a vibrational amplification at the resonance point, but the provision of hysteresis mechanism 90 degrades the acceleration transmissibility at the standard range of engine speed in comparison with the first embodiment as shown by a broken line in FIG. 5. The hatched portion of FIG. 5 illustrates an improvement of the first embodiment relative to the second embodiment in transmissibility.

Figure 8:
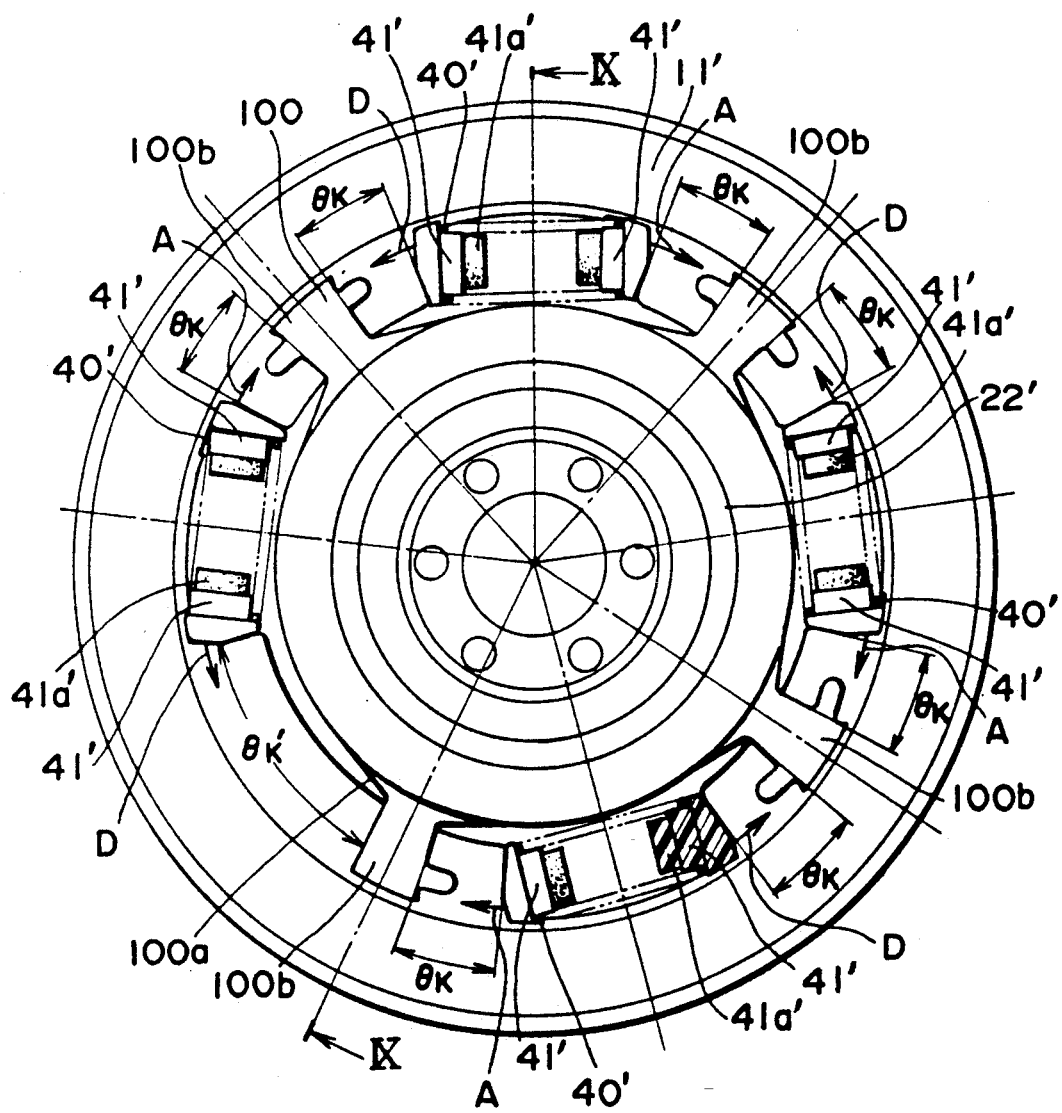
FIG. 8 is an elevational view of a torsional damper type flywheel device in accordance with a second embodiment of the present invention.
Figure 9:
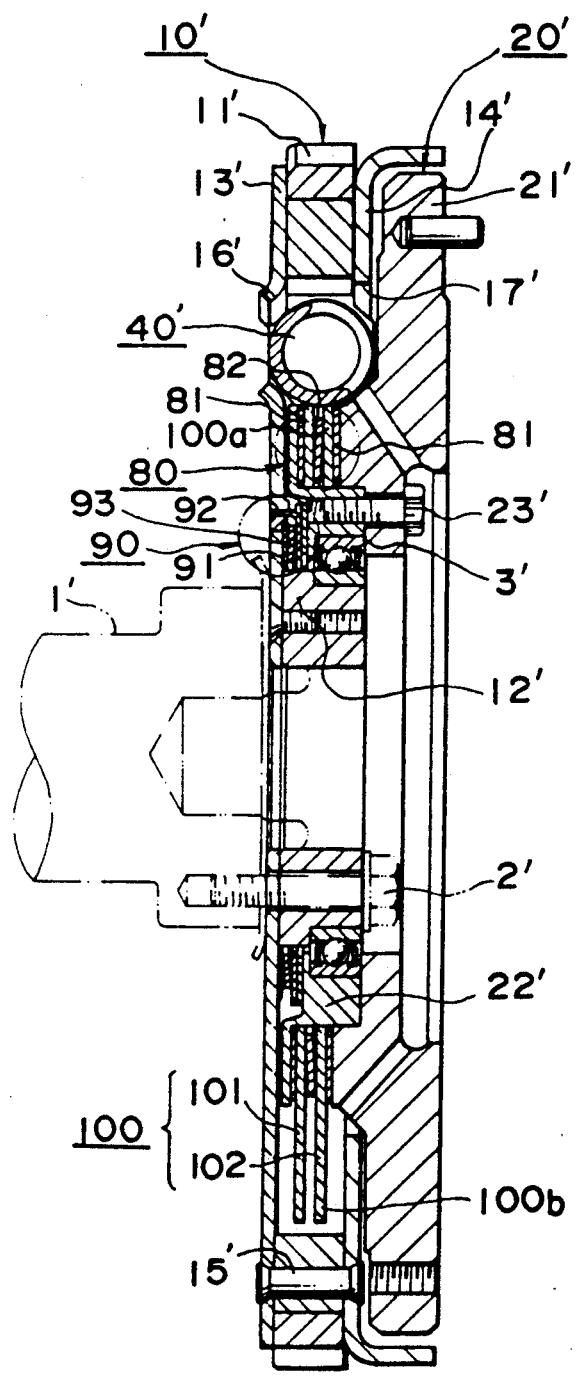
FIG. 9 is a cross-sectional view of the flywheel device taken along line IX—IX of FIG. 8.

FIGS. 8 and 9 illustrate a detailed structure of the flywheel device of the second embodiment. Drive side flywheel 10' is coupled to engine crankshaft 1' by set bolts 2' and driven side flywheel 20' is coupled to a power train of an automobile. Drive side flywheel 10' includes an outer ring 11', an inner ring 12' disposed radially inside and spaced from outer ring 11', and drive plates 13' and 14' disposed on opposite sides of outer ring 11' and fixed thereto by rivets 15'. Inner ring 12' is fixed to drive plate 13'. Drive plates 13' and 14' have openings 16' or slots 17'.

As illustrated in FIG. 9, driven side flywheel 20' includes a flywheel body 21' and a driven plate 22' coupled to flywheel body 21' by bolts 23'. Driven side flywheel 20' is rotatably supported by drive side flywheel 10' via a bearing 3'.

As illustrated in FIG. 8, driven disk 100 includes an annular portion 100a and arms 100b extending radially outwardly from annular portion 100a. As shown in FIG. 9, driven disk 100 comprises a pair of driven disk elements 101 and 102.

As illustrated in FIGS. 8 and 9, springs 40' are detachably supported by drive side flywheel 10' at openings or slots 16' and 17'. Spring seats 41' are disposed at opposite ends of each spring 40' and each spring seat 41' includes a rubber cushion 41a'. Arms 100b of driven disk 100 extend between any two adjacent springs 40' of the spring mechanism. Arms 100b of driven disk 100 circumferentially oppose springs 40' with an angular gap so as to be engageable with springs 40'.

As illustrated in FIG. 9, torque limiting mechanism 80 includes a thrust lining 81 and a cone spring 82. Cone spring 82 determines the torque limit of torque limiting mechanism 80. Because the torque limit is set above torques acting on the flywheel device at the standard range of engine speeds, torque limiting mechanism 80 does not slide at the standard range of engine speeds. As a result, the characteristic shift phenomenon which occurs in the flywheel device of the first embodiment does not occur in the flywheel device of the second embodiment. When the torque acting on the flywheel device is excessively large, torque limiting mechanism 80 slides and cuts the excessive torque above the torque limit to protect the power train.

As illustrated in FIG. 9, hysteresis mechanism 90 includes a thrust lining 91, a thrust plate 92, and a cone spring 93. Hysteresis mechanism 90 is disposed between drive plate 13' and driven plate 22'. Whenever the drive side and driven side flywheels 10' and 20' relatively rotate, hysteresis mechanism 90 slides. Therefore, hysteresis mechanism 90 is a continuously sliding friction mechanism. Such a continuously sliding friction mechanism causes a flywheel device to approach a non-divisional type flywheel device whose acceleration transmissibility is 1 and degrades the transmissibility characteristic as shown in FIG. 5.

Figure 11:
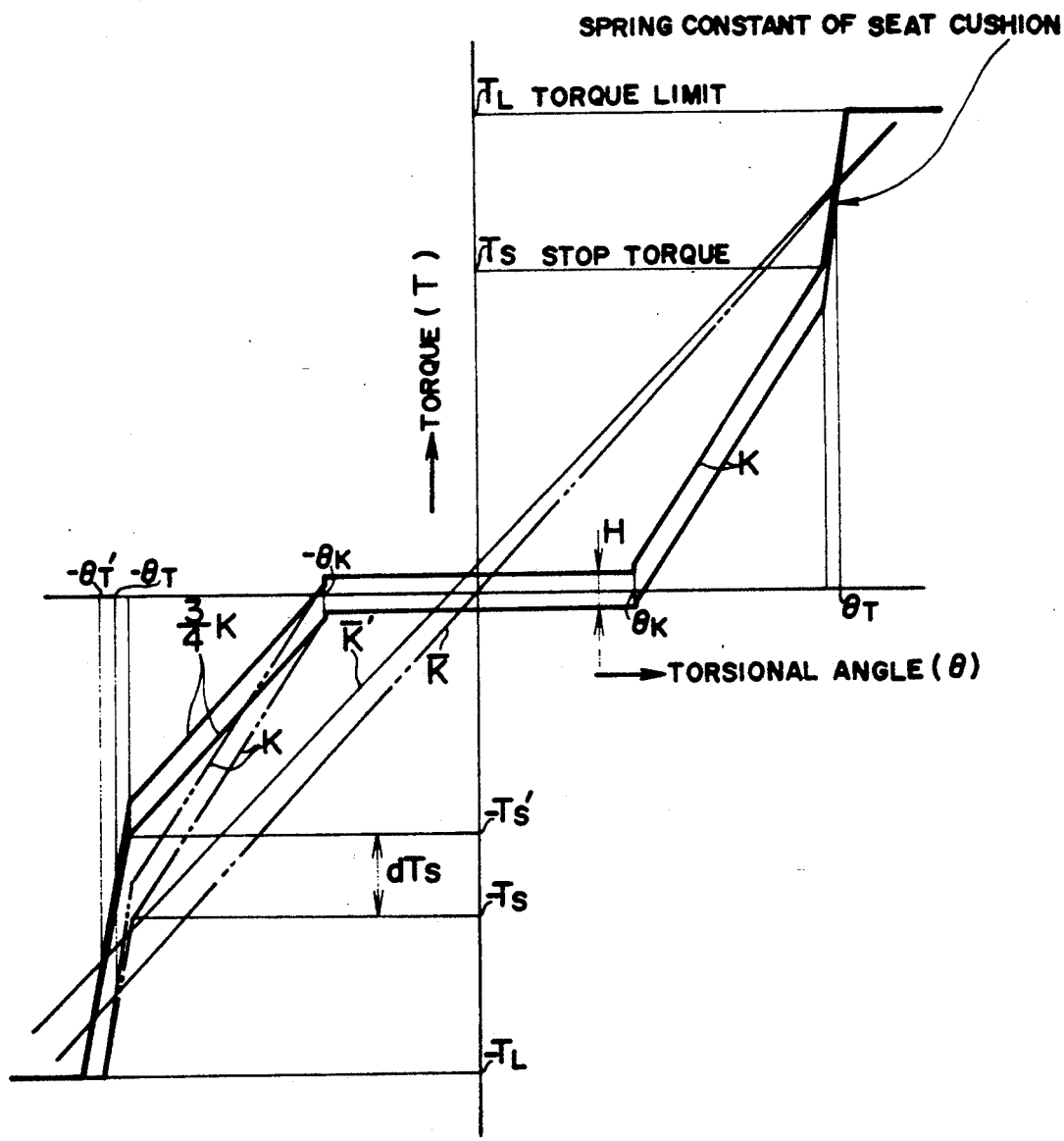
FIG. 11 is a diagram illustrating a torsional angle-torque characteristic of the flywheel device of FIG. 8.

Angular gaps provided on the acceleration side of springs 40' between arms 100b of driven disk 100 and springs 40' are selected to be constant for every spring 40', for example, $\theta_K$. On the other hand, at least one, but not all, of the angular gaps provided on the deceleration side of springs 40' between arms 100b of driven disk 100 and springs 40' are $\theta_K'$ which is greater than $\theta_K$, and the remaining annular gaps are selected to be $\theta_K$. As a result, in an acceleration condition, all the springs 40' engage respective arms 100b of driven disk 100 at the same time, and in a deceleration condition, only some of the springs 40' engage arms 100b of driven disk 100 and the remaining are not brought into engagement with arms 100b of driven disk 100. Because of this partial engagement in the deceleration direction, the torsional angle-torque characteristic of the flywheel device is as shown in FIG. 11, where a tangent of the characteristic of deceleration side, that is, the characteristic at the negative torsional angles, is smaller than that of the characteristic of acceleration side, that is, the characteristic at the positive torsional angles. Thus, an actual average spring constant $\overline{K}'$ of the flywheel device is smaller than an average spring constant $\overline{K}$ of a flywheel device having the same spring constant for the acceleration and deceleration sides thereof.

More particularly, as illustrated in FIG. 11, the average spring constant $\overline{K}$ of a flywheel device having the same spring constant for the acceleration and deceleration sides thereof and the actual average spring constant $\overline{K}'$ of the flywheel device of the invention are determined by the following equations:

$$\overline{K} = (1/(2 * \theta_T)) * ((T_L + T_S)/2 - (-T_L - T_S)/2)$$
$$= (T_L + T_S)/(2 * \theta_T)$$
$$\overline{K} = (1/(\theta_T + \theta_T')) * ((T_L + T_S)/2 - (-T_L - T_S)/2)$$

where, $T_L$ is a torque limit of torque limiting mechanism 80 at which it begins to slide, $T_S$ is a stop torque at which opposite cushions 41' begin to engage each other, $\theta_T$ is a torsional angle against which the average spring constant $\overline{K}$ is to be estimated, and $\theta_T'$ is a torsional angle against which the actual average spring constant $\overline{K}'$ is to be estimated.

When $\theta_T'$ is nearly equal to $\theta_T$, and $-T_S'$ is substituted by a summation of $-T_S$ and its deviation $dT_S$, $$\overline{K} = (1/(2 * \theta_T)) * ((T_L + T_S)/2 - (-T_L - T_S + dT_S)/2)$$
$$= (T_L + T_S)/(2 * \theta_T) - (1/(2 * \theta_T)) * (dT_S/2)$$

Therefore, the spring constant of the flywheel device is reduced by the differential between the average spring constant $\overline{K}$ and the actual average spring constant $\overline{K}'$, that is, by $(1/(2*\theta_T))*(dT_S/2)$. In the second embodiment, $$dT_S = (\tfrac{1}{2}) * K * (\theta_T - \theta_K)$$

$$dT_S/2 = (\tfrac{1}{4}) * K * (\theta_T - \theta_K)$$

Thus, the spring constant of the flywheel device is reduced by $\frac{1}{8}*K$ or by 12.5% because one of the angular gaps $\theta_K'$ is selected to be greater than the remaining angular gaps $\theta_K$.

This reduction in spring constant offsets the single resonance point of the flywheel device from resonance point $\overline{K}$ to resonance point $\overline{K}'$ in FIG. 12 in the direction toward lower speeds. This lower speed side offsetting of the resonance point makes the flywheel device less likely to resonate when the speed is above the engine idling speed, even if an unexpected torque variance acts on the flywheel device. This lower speed side offsetting of the resonance point can be accomplished without reducing the positive side torque capacity, reducing the positive side stop torque, or selecting greater moments of inertia of the drive side and driven side flywheels 10' and 20', and, therefore, the freedom of design is greatly increased.

As will be apparent from the above description, in accordance with the present invention, the following effects are obtained.

First, the deceleration side spring constant is reduced in comparison with the acceleration side spring constant. As a result, the flywheel device is unlikely to cause a vibration of great amplitude.

Second, when the driven plate is constructed to reduce the effective arms in the deceleration direction of the springs, the space of the omitted arm can be used for arranging other components of the flywheel device, which increases freedom of design.

Although a few preferred embodiments of the invention have been described in detail, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the invention as defined by the following claims.

What is claimed is:

1. A torsional damper type flywheel device having:
   a drive side flywheel rotatable relative to an axis of rotation;
   a driven side flywheel rotatable relative to the drive side flywheel about the axis of rotation, the driven side flywheel having a plurality of torque transmitting arms;
   a first, a second, and a third spring mechanism detachably supported by the drive side flywheel, the third spring mechanism including a plurality of springs, the torque transmitting arms circumferentially opposing the springs of the third spring mechanism, the torque transmitting arms being arranged relative to the springs of the third spring mechanism so that all the springs of the third spring mechanism are brought into contact with the arms in an acceleration direction of the springs and less than all of the springs of the third spring mechanism are brought into contact with the arms in a deceleration direction of the springs; and
   a friction mechanism disposed in series with the second spring mechanism.

2. The flywheel device according to claim 1, wherein the torque transmitting arms are provided on a deceleration side of less than all the springs of the one spring mechanism and are provided on an acceleration side of all of the springs of the one spring mechanism.

3. The flywheel device according to claim 1, wherein the driven side flywheel includes a flywheel body and a driven plate fixed to the flywheel body, the torque transmitting arms being defined on the driven plate of the driven side flywheel.

4. The flywheel device according to claim 1, wherein the third spring mechanism includes three springs.

5. A torsional damper type flywheel device having:
   a drive side flywheel and a driven side flywheel having a common axis of rotation and being rotatable relative to each other, the driven side flywheel including a flywheel body and a driven plate fixed to the flywheel body;
   a control plate rotatable relative to the drive side and driven side flywheels about their common axis of rotation;
   a first spring mechanism detachably supported by the drive side flywheel and connected between the drive side and driven side flywheels, the first spring mechanism including at least one first spring and spring seats disposed at opposite ends of each said first spring;
   a second spring mechanism detachably supported by the drive side flywheel and connected between the drive side flywheel and the control plate, the second spring mechanism including at least one second spring and spring seats disposed at opposite ends of each said second spring;
   a friction mechanism connected between the control plate and the driven side flywheel, the friction mechanism being disposed in series with the second spring mechanism, the series arrangement of the second spring mechanism and the friction mechanism being disposed in parallel with the first spring mechanism;
   a third spring mechanism supported by the drive side flywheel and connected between the drive side and driven side flywheels, the third spring mechanism being disposed in parallel with the first spring mechanism, the third spring mechanism including a plurality of third springs and spring seats disposed on opposite ends of each said third spring; and
   a plurality of torque transmitting arms defined on the driven plate of the driven side flywheel and circumferentially opposing the third springs of the third spring mechanism via the spring seats disposed at the opposite ends of the third springs, the torque transmitting arms being provided on a deceleration side of less than all of the third springs and being provided on an acceleration side of all the third springs.

6. The flywheel device according to claim 5, wherein three third springs are provided.

* * * * *